United States Patent [19]

Smithson

[11] Patent Number: 4,539,564
[45] Date of Patent: Sep. 3, 1985

[54] ELECTRONICALLY CONTROLLED INTERCONNECTION SYSTEM

[76] Inventor: G. Ronald Smithson, 1204 Lady Elaine, Valrico, Fla. 33594

[21] Appl. No.: 405,301

[22] Filed: Aug. 4, 1982

[51] Int. Cl.$^3$ .............................................. H04Q 9/00
[52] U.S. Cl. .......................... 340/825.79; 340/825.89; 370/67; 179/18.6 F
[58] Field of Search ...................... 340/825.79, 825.03, 340/825.89, 825.04; 370/14, 41, 42, 25, 29, 67; 179/18.6 F

[56] References Cited

U.S. PATENT DOCUMENTS

| | | | |
|---|---|---|---|
| 3,892,925 | 7/1975 | Fisk et al. | 370/67 |
| 4,057,711 | 11/1977 | Asthana et al. | 340/825.03 |
| 4,307,379 | 12/1981 | Wyland | 340/825.86 |
| 4,331,956 | 5/1982 | Anderson | 340/825.89 |
| 4,345,251 | 8/1982 | Begeman et al. | 340/825.89 |

Primary Examiner—Donald J. Yusko
Attorney, Agent, or Firm—Duckworth, Allen, Dyer & Pettis

[57] ABSTRACT

An all electronic interconnect system having high flexibility, low cost, and higher reliability. A central matrix is formed from a multiplicity of solid state analog switches in which each switch is controlled by a digital address. Each switch can connect a common switch point to one of a multiplicity of outputs. For use with digital devices such as computers and peripherals, a multiplicity of rows of the matrix may be connected to accept an N-bit parallel byte and to output such an input selectively to one of several channels. The channel to which the input is connected is selected by a digital address to each of the analog switches in the row. By using a multiplicity of rows, the matrix is built up to interconnect a number of input digital devices to a number of output devices through control of the electronic addresses. Control circuits are provided which permit rapid interconnection of any input device to any output device. A maintenance channel system is included which permits real time monitoring of the input and output of any digital connection to quickly locate sources of errors. The use of analog switches in the matrix eliminates the need for synchronization of the digital information and also permits the system to interconnect analog devices.

13 Claims, 12 Drawing Figures

ELECTRONICALLY CONTROLLED INTERCONNECTION SYSTEM

BACKGROUND OF THE INVENTION

1. Field of the Invention

The present invention relates to interconnection systems for interconnection of elements of digital systems, and more particularly to an electronically controlled interconnection system for selectively interconnecting a plurality of computers with a plurality of peripheral devices.

2. Description of the Prior Art

In recent years, the use of digitized electrical data signals in a wide variety of applications has increased enormously. This has been due to the relatively low cost, high reliability, and high data rates that modern technology has developed. Most large businesses of all types utilize computers which are required to receive digital data from a variety of input devices such as magnetic discs, tapes, keyboards, and similar sources and are also required to transmit digital data to terminals, printers, and other recording equipment. Industrial organizations utilize process control systems and equipment in which analog signals from sensors and the like are digitized for input to controllers. Similarly digital signals are utilized for remote control of the various controlled equipments. The same techniques are often applied to monitoring and control of heating and air conditioning in large buildings. In the medical field, large hospitals will monitor life support systems, and patient responses and activities through centralized computers and alarm systems. It is common to utilize digital techniques for such applications.

One of the problems in all of these large and complex digital systems is that of interconnecting peripherals to central computers and controllers. In most cases, flexibility is required in that the same peripherals are not always required with the same computer or controller. Therefore, means must be provided to disconnect peripherals from the central units and reconnect in other configurations. It is known to utilize patch panels, somewhat analogous to a telephone switchboard, in which multiconductor cables and plugs are used to provide interconnects. There are a number of obvious disadvantages to this approach. First, the personnel must have training and technical skills. Second, the personnel must manually make the connects and disconnects which, due to the complexity of some systems, may not be in a convenient location. The jack fields necessarily have large numbers of contacts which creates problems with high resistance contacts, breakage of pins, and relatively short life when frequent changes are required.

Other approaches include the use of automatic switches and relays which may be remotely controlled. However, these systems also suffer from the mechanical problems associated with contacts and require constant maintenance and repair and generally require significant operating power, making failsafe operation costly. Thus, this type of system has a high recurring maintenance cost as well as a high capital investment required.

There is a need for a remotely operated electronic interconnect system having no relays or metallic contacts and that can be manufactured at low cost, that will require a small amount of power, that will not require synchronization, and that will be failsafe with respect to primary power.

SUMMARY OF THE INVENTION

My invention is an all electronic interconnect system having maximum flexibility, low cost, and high reliability. Thus, it is ideal for application to computer systems, process control systems, heating and air conditioning systems, medical monitoring systems, and similar applications. Although my invention is not limited thereto, I prefer to disclose it with reference to its use in a computer system.

A typical electronic data processing center may have multiple computers for processing data, multiple input terminals for entering data, and multiple printers for producing reports. The manager of the system will be required to vary the connections of the terminals and printers to the computers from day to day determined by the particular loads and operations required. In accordance with my invention, I provide a central matrix built up from solid state analog switches. The analog switches may be packaged with eight switches per package with each switch being controlled by a 3-bit digital address. I can therefore provide a bank of sixteen analog switches with each pair of switches providing two-way channels. Each of the eight switches has one lead common to all switches in its package. Thus, a sixteen lead input port is defined which permits 8-bits to be transmitted in each direction through the bank of switches. By connecting the three address leads in parallel for all of the switches in the bank, the same switch in each of the switch packages will be closed while the other seven switches in each package will remain open. Therefore, the sixteen output leads will represent a two-way 8-bit channel.

Depending upon the number of computers to be utilized, a multiplicity of banks of switches may be provided with each bank having a common address input thereby providing an input port. The plurality of output switch terminals of the multiplicity of banks are connected in parallel to form eight two-way output channels from the matrix thus formed. As an example, assume an 8×8 matrix of two-way switches. This arrangement would provide eight 16-bit input ports and eight 16-bit output channels. Thus, eight computers and eight peripherals could be permanently connected to the ports and channels, respectively.

A remote control system is provided in accordance with my invention which generates the necessary addresses to enable each bank of switches so as to connect the input port switches to the desired output channel switches. The control system includes appropriate interlocks to permit a channel to be interconnected to only one port at a time. The control system includes displays which indicate the interconnections made at any time, and provides means for maintenance checks of the matrix by comparing the output signals into a channel from the signals at an input port and vice-versa.

As may now be recognized, the switching elements of my interconnection system are solid state and can handle any data rates within their bandwidth and dynamic range with no timing or clocking circuits required for the data. A single change in connection of a peripheral to a computer can be made quickly and easily by unskilled personnel at a remote location, or the entire system may be broken down and reconfigured within a few seconds.

The invention permits rapid restoration of service when a failure occurs. A failure of a printer, for example, can be corrected by quickly switching to a spare printer or to an unused printer until the required repairs on the defective unit can be effected. The system is extremely flexible. For example, if the system were designed for three computers it would be necessary to supply only three banks of switches to give three input ports. If later, additional computers are added to the system, additional banks of switches can be quickly installed. As is common in computer configurations, the switch banks may be built on individual plug-in cards to permit ease of expansion or replacement of a defective switch.

In the situation in which errors are found with respect to a peripheral, the maintenance feature of my invention permits rapid trouble shooting to determine if the problem is in the peripheral itself or in the interconnection system. If the maintenance test shows that the same data into the port is appearing in the output channel to which it is switched, a properly operating interconnection is indicated. Therefore, the peripheral is faulty and the steps to repair the unit may then be taken. If the test shows a defective switch in a bank of switches, the computer may be changed to input an unused port and that port addressed to the desired peripheral. The defective bank may be removed and replaced by even inexperienced maintenance personnel. In the event of a failure in the interconnect system which is common to all of the switches, manual interconnections may be made between the computers and the peripherals until the common defect can be repaired. Thus, the system may be considered to be failsafe. Advantageously, my invention uses very low power elements, such that an 8×8 matrix system uses about ½ watt for the interconnect circuits and about 10 watts for the displays. I provide a battery backup for the interconnect circuits that gives true failsafe operation.

It is therefore a principal object of my invention to provide an all electronic interconnection system to connect centralized digital equipment with peripheral equipment in which the connections may be made remotely between any central unit and any peripheral.

It is another object of my invention to provide an interconnection system especially adapted to permit rapid interconnection between several central computers and a multiplicity of peripheral devices such as printers, terminals, recorders and the like.

It is still another object of my invention to provide a switch matrix using analog solid state switches which do not require a timing clock or synchronization with the data flowing through the matrix.

It is yet another object of my invention to provide an electronic matrix in which switching is accomplished by a 3-bit address and which can provide 8-bit parallel input and output paths.

It is still a further object of my invention to provide a selectable interconnection device that can switch various signal sources to desired signal sinks by means of digital addresses.

It is a further object of my invention to provide an interconnection system in which the data flowing through the switching matrix may be tested to determine the condition of the switches.

These and other objects and advantages of my invention will become apparent from the following detailed description and the drawings.

DETAILED DESCRIPTION OF THE PREFERRED EMBODIMENT

Figure 1:
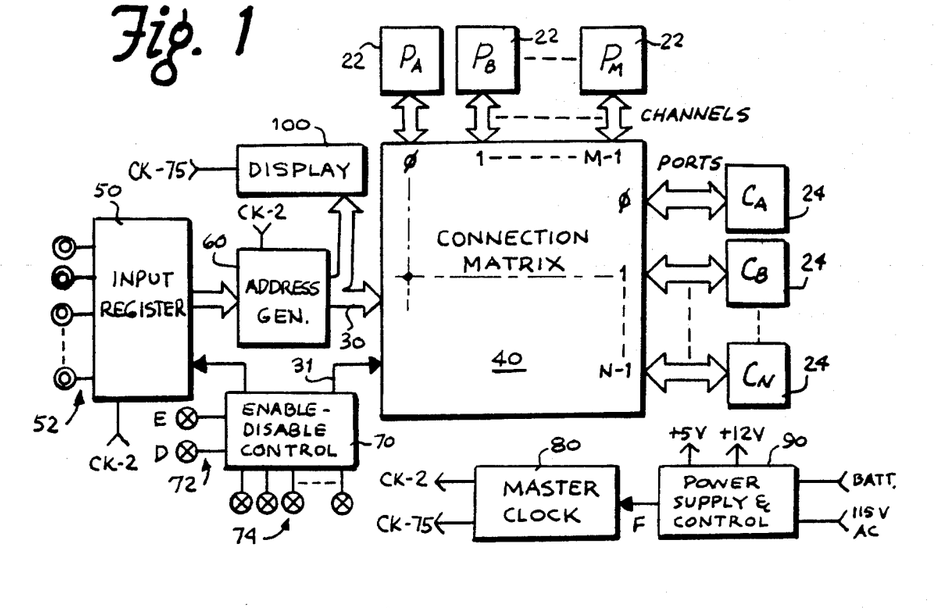
FIG. 1 is a simplified block diagram of an exemplary version of my interconnection system as applied to a computer operation.

FIG. 1 is a simplified functional block diagram of the interconnection system of my invention. It is assumed that the system to be interconnected consists of N central units 24 and M peripheral units 22, although it is to be understood that there may be more peripheral units than central units or vice-versa. A connection matrix 40 is provided which is controllable to connect any peripheral 22 to any central unit 24. Connection matrix 40 includes N ports and M channels although it is to be understood that, in general, there may be more ports and channels than central units and peripheral units to provide flexibility, spares and expansion capabilities. In the broadest aspect of my invention, the ports and channels will be two-way; that is, digital signals may be transmitted and received over the busses between the peripherals 22 and the channel inputs, and the central units 24 and their respective port inputs.

In an application in which the central units 24 are computers and the peripherals 22 are printers, terminals, and the like, the busses shown will handle parallel data bytes. Typically, the busses may handle 8 or 16 parallel bits. It will be understood, however, that the number of bits per byte can be selected as required.

As will be described in more detail hereinbelow, connection matrix 40 utilizes analog switch points. Therefore, when a connection is set up, for example between peripheral 22 labeled $P_a$ and central unit labeled $C_b$, channel $\emptyset$ is connected to port 1 by the matrix as indicated by broken lines 21 and 23. The interconnection is analog in nature and therefore requires no clock or synchronization with the digital data which may flow through the connection. Any type of signal may be passed within the dynamic range of the analog switches and is not limited to digital signals.

The control system for setting up the desired interconnections between central units 24 and peripherals 22 includes input register 50, address generator 60, and display 100. An enable/disable control 70 also permits a set of switch points in matrix 40 to be disabled during an interconnect operation and to be enabled after the connection is made. Input register 50 includes a plurality of push button switches 52 which may be equal in number to the number of channels for connection matrix 40. A master clock 80 provides a 2 Hz clock signal to the input register. When it is desired to connect a peripheral such as peripheral 22, marked $P_b$, to a specific central unit, for example central unit 24, marked $C_n$, the operator notes that peripheral $P_b$ 22 is connected to channel 1. He would therefore depress push button 52 marked 1. This causes input register 50 to cause enable/disable control 70 to disable channel 1 in connection matrix 40. Address generator 60 will begin to step through the addresses of each port of connection matrix 40. Display 100, which is preferably an LCD type, requires a 75 Hz clock from master clock 80 and will display the addressed port. In this example, port N-1 is desired and the push button switch 52 will be held depressed until display 100 indicates that the address for port N-1 is being generated. At that point, the button is released and after a short delay, enable/disable control 70 enables channel 1 and port N-1. At this point, peripheral 22 shown as $P_b$ is directly connected to central unit 24, marked $C_n$, via the matrix 40.

Switches 72 marked E and D permit the entire matrix 40 to be disabled or enabled as desired. Switches 74 permit individual channels to be disabled.

The power supply and control 90 normally operates from 115 volt ac and produces +5 volts and +12 volts for the logic circuits and the matrix 40. A 12.6 volt alkaline battery is provided to maintain all of the channel settings in case the ac power fails. The connection from power supply 90 to master clock 80 marked F provides a line failure signal. The 5 volts normally powers the display system but is omitted when on battery power to conserve energy.

Figure 2:
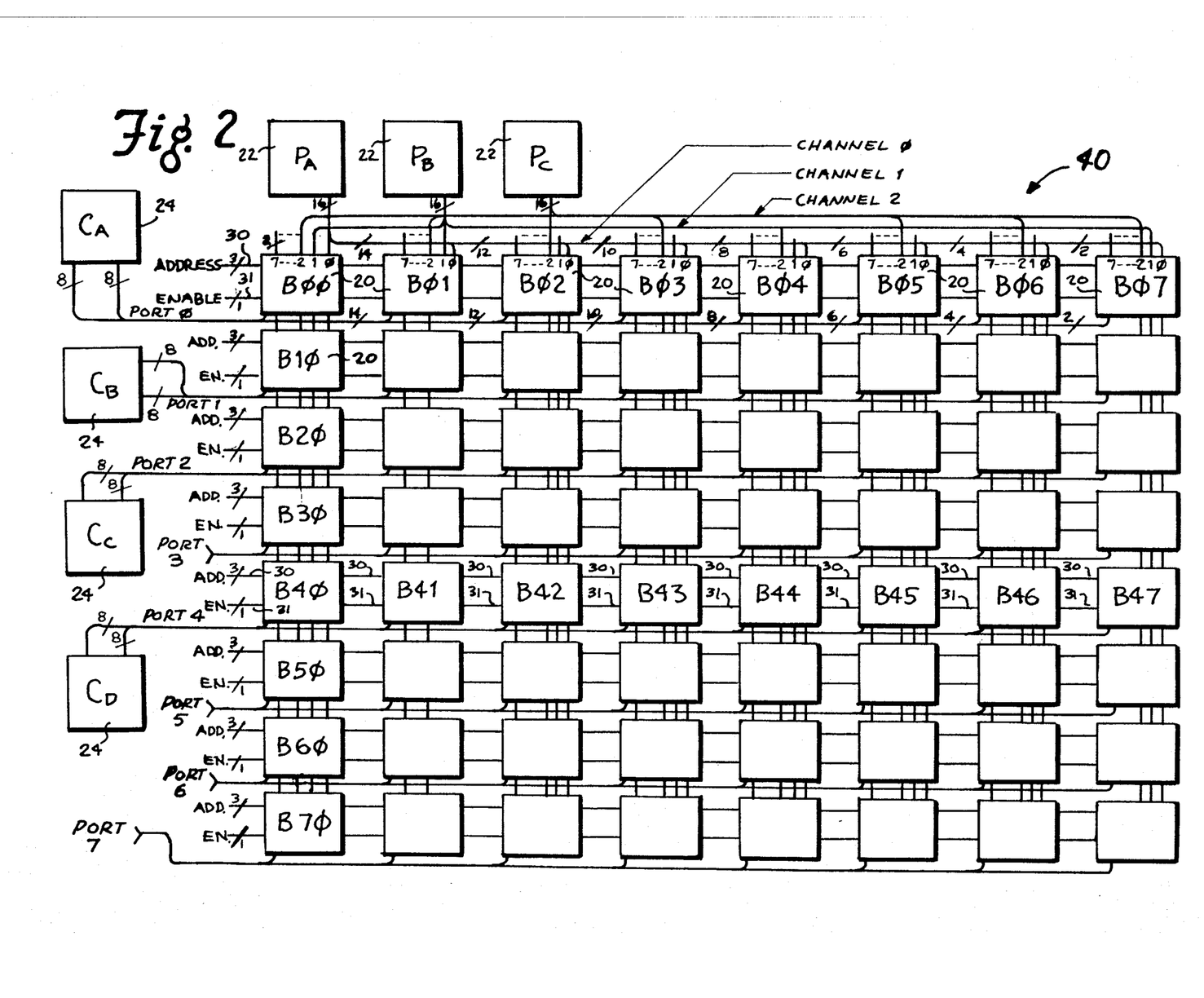
FIG. 2 is a block diagram of the connection matrix of FIG. 1.
Figure 3:
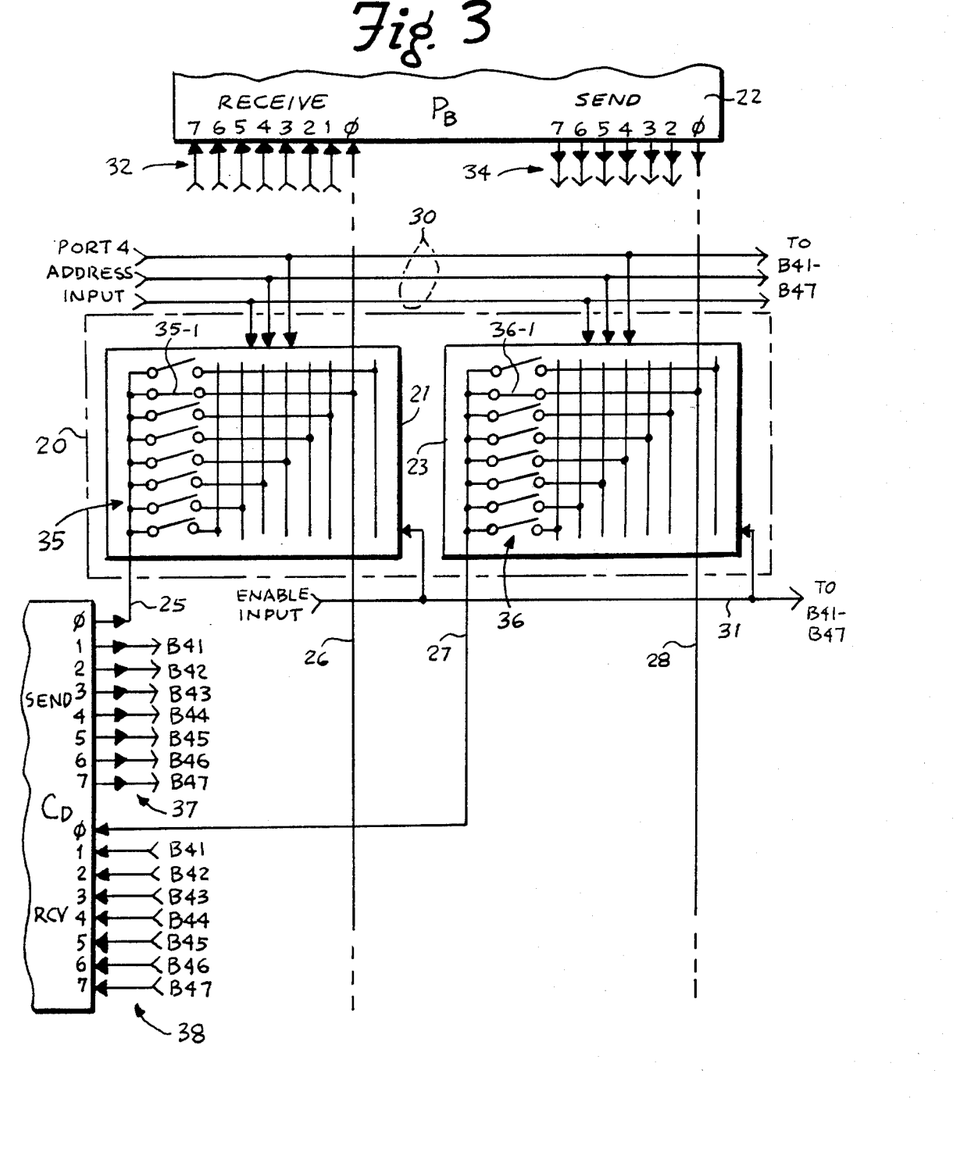
FIG. 3 is a partial schematic diagram of the connection matrix of FIG. 2 showing the matrix switches for row 4, column 0.

Turning now to FIG. 2, a block diagram of connection matrix 40 is shown. For purposes of explanation, an 8×8 matrix is illustrated. Each block 20 in the matrix is a pair of analog switches which may be two 4051 analog switches 21 and 23 as shown in FIG. 3. As may be recognized, FIG. 3 is a more detailed diagram of computer 24-$C_D$, printer 22-$P_B$, and matrix block 20-B40 shown in FIG. 2. Switch 21 includes a set of eight single pole-single throw switches 35 which may be selected one at a time by means of a 3-bit parallel address on address input leads 30. Thus, the binary number present on lead 30 will close one of the eight switches 35. In FIG. 3, the address of switch 35-1 is assumed to be present on address input lead 30 and therefore is closed as shown. This connects the SEND 0 output of computer 24-$C_D$ on lead 25 via closed switch 35-1 to output lead 26 which is connected to the RECEIVE 0 input of printer 22-$P_B$. It is to be understood that ADDRESS input leads 30 are connected to the address inputs of analog switch 23 which therefore closes analog switch 36-1. Leads 30 also connect to all address inputs of blocks B41 through B47. Lead 28 from the SEND 0 output of printer 22-$P_B$ is connected by switch 36-1 to lead 27 to the 0 RECEIVE input of computer 24-$C_D$. For switches 35-1 and 36-1 of analog switches 35 and 36, respectively, to close due to the address on address input leads 30, an enable signal must be present on lead 31. Lead 31 connects to the ENABLE inputs of all switches in row 4 of FIG. 2 and all of the switches in blocks B40 through B47 will respond to the address code on leads 30 and the number 1 switch of each will be closed.

Referring back now to FIG. 2, it is to be noted that the ADDRESS inputs 30 of the 8 two-way switches B40 through B47 are connected in parallel. Therefore, the corresponding number 1 switch will be closed in each of the 8 two-way analog switches. Similarly, the ENABLE input 31 connects to all eight of the switches B40 through B47 and each will be enabled by an enable signal thereon. As shown in FIG. 3, the SEND outputs from computer 24-$C_D$ connect to the corresponding left hand analog switch of blocks B41 through B47 with the output of each of such switches connected to the printer 22-$P_B$ receive inputs 1 through 7. Similarly, the SEND outputs 1 through 7 of printer 22-$P_B$ connect to the number 1 output line on the right hand switch of each of the two-way switches B41 through B47 with the common leads of each of such switches connecting to the corresponding RECEIVE input leads of computer 24-$C_D$ 1 through 7.

In FIG. 2, printer P22-$P_A$ has its sixteen input and output leads connected to the respective zero outputs of the 128 analog switches in matrix 40. Printer 22-$P_B$ has its sixteen lead bus connected to the number 1 output of the 256 analog switches and printer 22-$P_C$ has its sixteen leads connected to the number 2 output of the 128 analog switches. In the example, output leads 3-7 of the analog switches 20 are not connected and may serve as spares or for expansion of the system by connecting to additional output peripherals.

Preferably, I refer to the 16-bit output busses from the parallel outputs of each column as "channels". That is to say, the bus connecting to all of the 0 outputs of switches 20 is channel 0, the bus from the number 1 outputs is channel 1 and so on. A 16-bit bus is produced from the sixteen common switch terminals of switches 20 in each row. For example, in the top or zero row, an input which I refer to as a port is indicated as port zero, which in that bus, is produced by the two common switch leads from each dual switch 20, B00 through B07. In this instance, the eight SEND leads from computer 24-$C_A$ connect to the eight left hand analog switches in two-way switches 20 and the eight RECEIVE leads to computer 24-$C_A$ connect to the eight right hand common switch leads of the top row of switches 20.

As may now be seen, each row of switches 20 produces a 16-bit parallel input port labeled port 0 through port 7. Computer 24-$C_B$ connects to port 1, computer 24-$C_c$ connects to port 2, and computer 24-$C_D$ connects to port 4. Ports 3, 5, 6, and 7 are shown not connected and may be used as spares or for later expansion of the system.

It is now apparent that any channel 0 through 7 can be interconnected with any port 0 through 7 by placing the channel address into the row of switches 20 associated with the selected port. As used in the example of FIG. 3, the address to switches B40 through B47 is that of channel 0 which therefore connects computer 24-$C_D$ to printer 22-$P_A$. If it were desired to connect computer 24-$C_D$ to printer 22-$P_C$, the 0 channel address would be removed and the address of channel 2 would be applied to switches B40 through B47. Thus, any input device to a port may be directly connected to any output peripheral simply by the parallel addressing of the appropriate rows of switches. As is also apparent, the direct connection of a peripheral to an input device is completely independent of other peripherals and input devices which may be interconnected as required.

Figure 4:
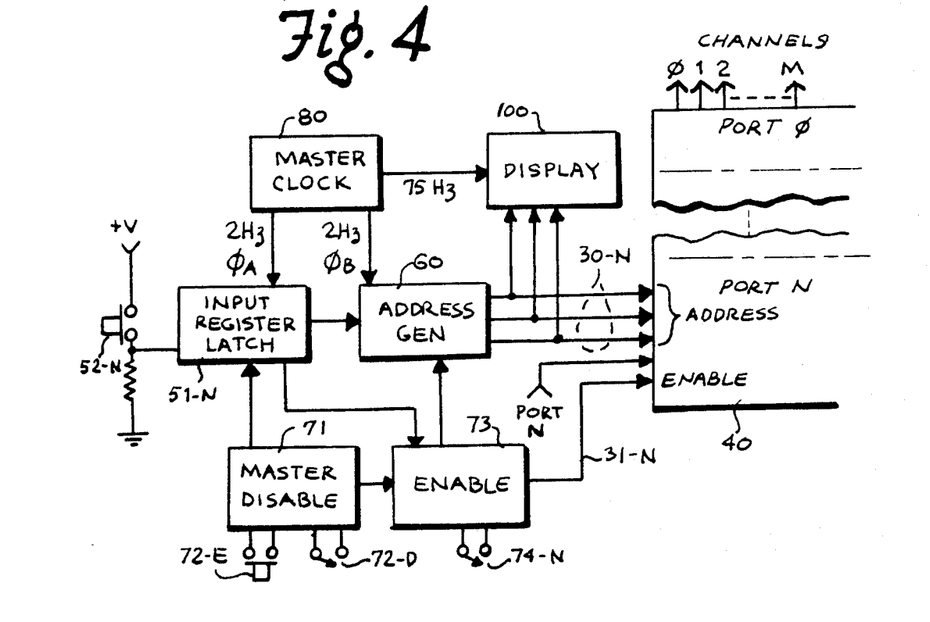
FIG. 4 is a simplied block diagram showing the channel selection circuits.

In FIG. 4, a simplified block diagram of the channel selection portion of my invention is shown. A partial diagram of an N×M matrix is indicated with port N shown to illustrate the manner in which a channel is selected for connection to the device associated with port N. In one implementation of my invention, a push button 52-N is utilized to select the desired channel. The channel selection process is interrelated with the enable-disable function. As previously discussed, lead 31-N connects to the analog switches in matrix 40 which are associated with port N. A HIGH on this lead will disable all of the analog switches in port N while a LOW enables the switches. A master disable circuit 71 permits the analog switches for all of the ports of matrix 40 to be disabled when switch 72-D is closed. When it is desired to enable all of the analog switches, master enable switch 72-E is depressed and switch 72-D is opened. The analog switches associated with port N can be disabled without affecting the switches in any other port by closing switch 74-N which places a HIGH on lead 31-N. When a channel selection is to be made for port N, both the master disable switch 72-D and port disable switch 74-N must be open and port N enabled. Input register latch 51-N senses whether push button switch 52-N is open or closed. When switch 52-N is closed, the master clock 80 will latch this condition to the output of input register latch 51-N by a strobe which occurs at an approximate 2 Hz rate. Therefore, as long as the operator holds push button 52-N depressed, an output will occur from input register latch 51-N. This output causes address generator 60 to step through the N address and to output those addresses on address bus 30-N, which for illustration is shown to have three parallel leads. This permits eight binary addresses to permit control of up to eight channels. It will be understood that this number of channels can be increased adding additional analog switches to the matrix and by an appropriate increase in the number of leads in address bus 30-N. The 2 Hz clock signal from master clock 80 controls the rate at which address register 60 steps through the channel addresses. Address bus 30-N also connects to display 100 which uses seven segment displays to indicate the channel number at any given time. Preferably, these displays are of the liquid crystal type. Master clock 80 supplies a clock of about 75 Hz to the LCD display 100. During the channel selection process, the enable lead 31-N goes HIGH disabling all of the analog switches associated with port N. Advantageously, this prevents interference with any channels in use at the time of selection. When the address generator 60 reaches the channel number desired, the operator releases push button 52-N stopping address generator 60 which is then outputting the desired address to address bus 30-N and display 100 is indicating the channel to which port N is connected. Although I prefer the above described addressing method due to the simplicity of the control panel, it will be obvious that each port could have an M-point rotary switch, or M interlocked push button switches to permit channel selection.

Figure 5:
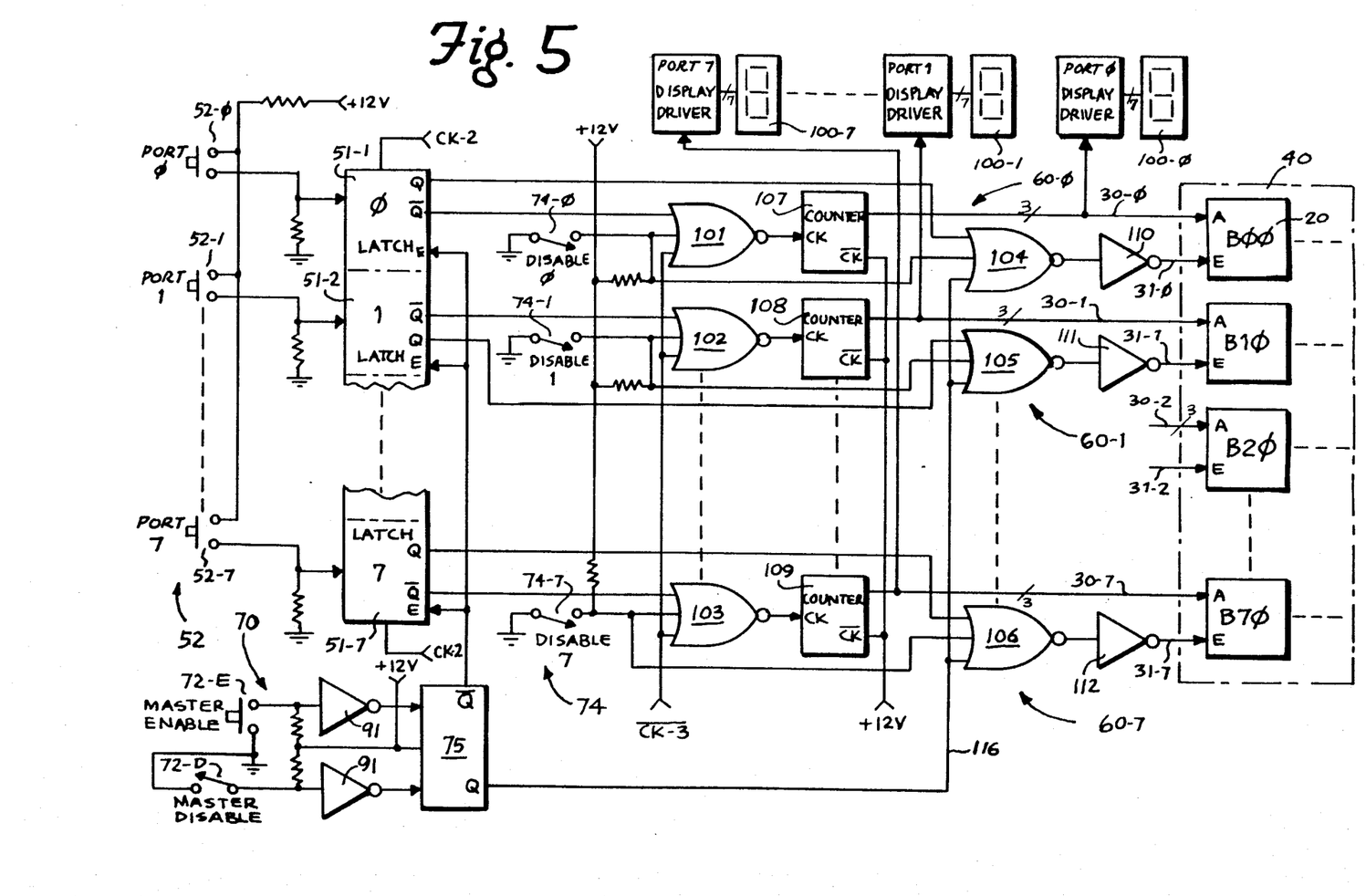
FIG. 5 is a schematic diagram of portions of the channel selection circuits of FIG. 4.

FIG. 5 is a schematic of the channel select circuitry of FIG. 4 for the 8×8 matrix version of my invention. Thus, the operation of the select circuits will be explained with reference to the 8×8 matrix 40 of FIG. 2 and shown partially in FIG. 5 and with reference to the control panel 165 shown in FIG. 7. The portion of matrix 40 in FIG. 5 includes two-way analog switches 20 B∅∅, B1∅, B2∅, and B7∅. A set of channel select push buttons 52 is provided and identified with port ∅ through port 7. As will be evident, the port ∅ push button 52-0 will permit connecting the device associated with port 0 to any of the channels ∅ through 7. Similarly, push button 52-1 associated with port 1 permits selection of channel ∅ through 7 which is desired to be connected to the device associated with port 1. The selection of the interconnection between a port and a channel is made, as previously discussed, by placing the 3-bit address associated with the channel to be selected on the address input bus 30 associated with the port. For example in FIG. 5, address bus 30-∅ to analog switch 20-B∅∅, which consists of three leads, is addressed by the three parallel bits representing the channel to be selected. During the selection time, the enable input via lead 31-∅ is disabled preventing connection of port ∅ to any of the channels during the selection process.

Once the address that is desired is selected, it remains on bus 30-∅ until changed by the operator. As will be noted, bus 30-0 also connects to display 100-∅ via port ∅ display driver 115. The channel number represented by that address will therefore be shown by seven segment display 100-∅, also shown in FIG. 7.

Figure 7:
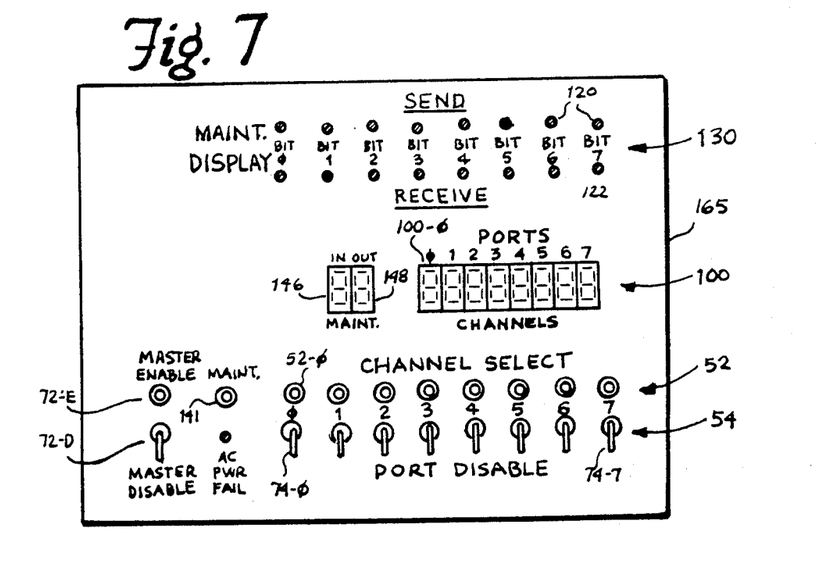
FIG. 7 is a control panel layout for the exemplary version of my invention.

As previously discussed, an enable/disable circuit 70 permits all channels and all ports to be disabled by a master switch, seen in FIGS. 5 and 7 as switch 72-D. When switch 72-D is closed, flip-flop 75 is controlled via inverter 93 to produce a HIGH on the Q output. Thus, a HIGH is applied to gates 104 through 106 via lead 116 which causes the enable line on all of the input ports to go HIGH, disabling the entire matrix. A LOW signal on the Q output of flip-flop 75 when the master disable switch 72-D is closed causes latches 51-1 and 51-2 to be disabled and no channel selection may be made under this condition. When master disable switch 72-D is opened and master enable push button 72-E actuated, flip-flop 75 produces a HIGH at the $\overline{Q}$ output, enabling latches 51-1 and 51-2 and enables each of the ports input to matrix 40 by removing the HIGH from lead 116. As mentioned above, each individual port may also be disabled by means of disable switches 74. For example, if switch 74-7 were closed, a HIGH is produced on lead 31-7, disabling port 7 without affecting any of the other ports.

To be able to select a channel for any port, the master disable switch 72-D must be open as well as the disable switch 74 associated with the port for which a selection is to be made. Assume for illustration that it is desired to connect a computer feeding port ∅ to channel 5. The operator makes certain that disable switch 74-0 is open and that the master disable switch 72-D is open. At this point, the analog switches associated with port ∅ are all enabled. The operator would then depress push-button switch 52-∅ placing a positive voltage at the input of latch 51-1. Latch 51-1 may be a type 40175 integrated circuit which contains a quad of flip-flops. Thus, latch 51-1 will control ports ∅ through 3. A second quad latch 51-2 will then control ports 3 through 7. A clock signal CK-2 is applied to latch 51-1 which operates at approximately a 2 Hz rate. The latches 51-1 and 51-2 are being strobed by clock pulses identified as CK-2. These pulses are about 125 ms in width and occur at about a 2

Hz rate. When the ∅ input of latch 51-1 is positive, indicating that push button 52-∅ is depressed, the next clock pulse latches the positive select signal producing a HIGH on the zero Q output and a LOW on the zero $\overline{Q}$ output. Gate 104 and inverter 110 produce a HIGH on enable lead 31-0 from the Q output which disables all of the switches 20 in port 0. The Q bar output from latch 51-1 enables gate 101 which is receiving a clock signal CK-3. This clock signal is gated through to the clock input of counter 107 having a 3-bit parallel output bus 30-∅. Clock CK-3 is identical to clock signal CK-2 except that it has been offset by 180° and inverted. Counter 107 operates on the leading edge of its clock signal and therefore will respond to the CK-3 clock signal a short time after latching has occured, which permits time for settling of the latching function to eliminate transitional noise. It should be understood at this point that the frequency of the clock signal is not critical and is selected to permit the operator time to respond to the display count.

As counter 107 is clocked by CK-3, it will count from ∅ to 7 and if push button 52-∅ is held down, will return to ∅ for another cycle of counting. Normally, the operator would watch display 100-∅ which is changing as the 3-bit address on address bus 30-∅ changes. Assuming for example that channel 4 is to be selected, the operator would release push button 52-∅ as soon as he observed the numeral 4 on display 100-∅. Release of push button 52-∅ removes the positive signal from the input to latch 51-1. The next CK-2 pulse then releases the latch and the Q output goes LOW removing the disable signal from enable lead 31-∅. The $\overline{Q}$ output goes HIGH, disabling gate 101 to prevent clock signal CK-3 from further stepping of counter 107. Therefore, counter 107 stops on count 4 which connects port ∅ to channel 4 and display 100-∅ remains with a "4" indication.

When the system of my invention is in operation, there may on occasion be a malfunction indicated in a peripheral connected to one of the channel outputs. The question arises whether the problem is in the peripheral, in the source of the data, or in the connection matrix. In accordance with my invention, I provide a maintenance channel which will quickly test and indicate the source of the problem. For example, refer to FIG. 6, which is a simplified block diagram of my maintenance channel system. Assume that a printer 22 ($P_b$) connected to channel 1 has been coupled to computer 24 ($C_d$) connected to port 4 and that printer 22 begins to misprint or to garble. A SEND bus S from computer 24 is input to port 4 and connected via matrix 40 to RECEIVE input of printer 22 indicated by R. If the system were working properly, the eight parallel bits from the SEND output of computer 24 would appear at the RECEIVE input of printer 22 exactly as transmitted and printer 22 would faithfully produce the required printed copy. Similarly, information originating from printer 22 on the parallel eight SEND leads to channel 1 would appear on the eight-lead R input through computer 24 over the RECEIVE bus connected to the RECEIVE terminal of port 4.

Figure 6:
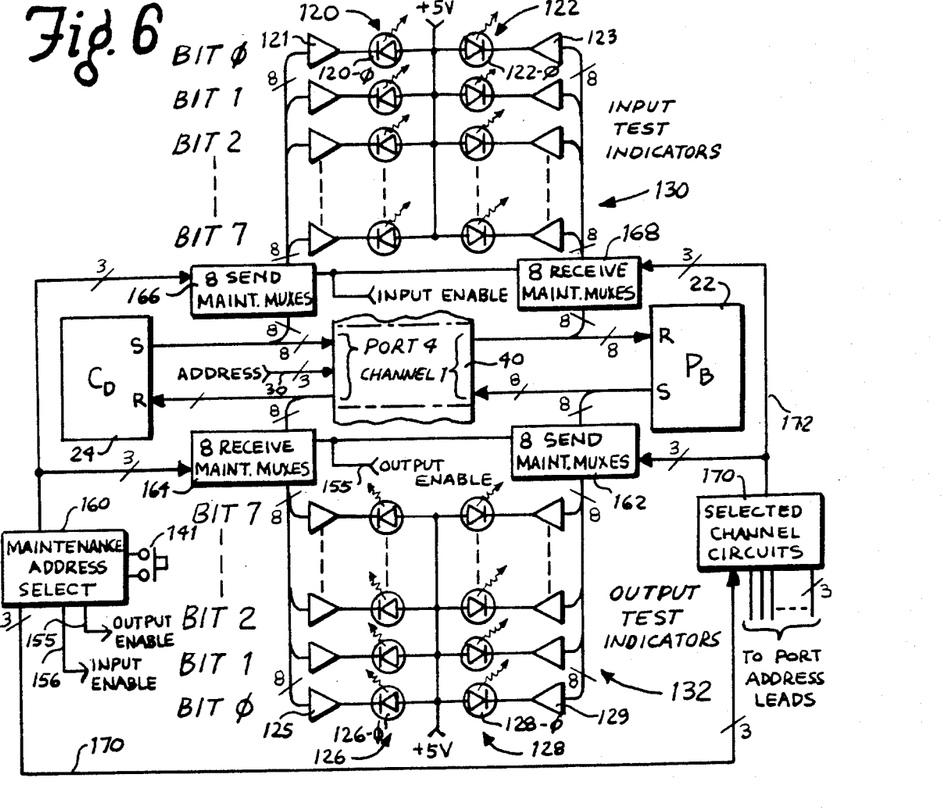
FIG. 6 is a simplified block diagram of one implementation of a maintenance channel for dynamic testing of the system of the invention.

To determine if the input data to the port is appearing at the output from the channel, I provide a set of eight LED indicators 120 to be controlled by the eight leads for the input to the port and a second set of eight LED's 122 to be controlled by the eight leads of the channel output. These LED's are preferably mounted such that the LED for the bit ∅ input is adjacent the LED for the bit ∅ output with the remainder of the bit indicators similarly aligned. The input LED's 120 are driven by driver amplifiers 121 while the output LED's 122 are driven by amplifiers 123. These amplifiers have their inputs connected to the corresponding bit leads of the computer SEND bus and the printer RECEIVE bus and serve to isolate the LED's so no loading of the busses occurs. When a bit is HIGH, for example bit ∅, then LED 120-0 associated with bit ∅ will be illuminated. If that HIGH is appearing on the bit ∅ output lead from channel 1, then the bit ∅ LED 122-∅ should also be illuminated. Thus, as the bits change from HIGH to LOW as data is being transmitted, the LED's will be alternately light and dark.

If the connection through the matrix is operating properly, it may be seen that the two adjacent LED's for each bit will be illuminated and darkened together. Therefore, the operator may simply observe the set of eight input LED's and output LED's to determine if all are blinking in synchronism. If so, this indicates that the matrix 40 is working properly. If one of the analog switches is defective, say for example the switch for bit 2, then each time bit 2 is HIGH on the input, the output LED would remain dark. The operator could then immediately determine that the problem was in the matrix and could pin-point the exact chip which was defective. Thus, a repair could be very quickly be effected by replacing the bad analog switch.

My maintenance channel also can test the output from port 4 against the input to channel 1 from the SEND bus from printer 22. Here, a second set of LED's 128 is shown connected via driver amplifiers 129 to the SEND bus from printer 22 and output LED's 126 driven by driver amplifiers 125 from the output bus from port 1 to computer 24. Thus, the integrity of the analog switches in this portion of port 4 may be checked by comparing the input and output LED's 126, 128 as described above.

It is required to be able to test any of the eight ports and eight channels of the exemplary embodiment being described herein. Thus, it is necessary to switch a single set of LED indicators to the desired port and channel to be tested. To this end, I utilize four sets of multiplexers formed by analog switches of the same type utilized in the matrix 40. Block 166 of FIG. 6 represents eight maintenance multiplexers identified as SEND maintenance multiplexers since these units connect the port SEND leads to the LED indicators 120. Similarly, the output from channel 1 is shown connected to block 168 comprising eight RECEIVE maintenance multiplexers which drive the receive LED's 122. In like fashion, block 162 and 164 contain eight SEND multiplexers and eight RECEIVE multiplexers, respectively, for the input to channel 1 and the output from port 4. It is to be understood, of course, that eight-lead busses from each of the blocks 166, 168, 162, and 164 connect to the corresponding inputs and outputs of the remainder of the ports and channels.

To select which port and channel is to be tested by the maintenance system, I utilize a maintenance address select circuit 160 having a manually operated push button 141 as also shown on panel 165 of FIG. 7. With push button 141, the operator can step the maintenance multiplexers 164, 166 through the eight addresses with the address selected indicated by a seven-segment display 146. For example, if port 4 were to be tested, push button 141 is operated until the IN maintenance indicator 146 shows port 4. This means that the port 4 address is being applied to maintenance multiplexers 166 and 164 on the port side of the matrix 40.

It is also necessary to connect maintenance multiplexers 162 and 168 to the channel to which port 4 is interconnected. In the example shown in FIG. 6, this is channel 1. This function is provided by "selected channel" circuits 170. The term "selected channel" is with reference to the channel which has been selected to be interconnected with port 4 through address generator 60 as previously described. Selected channel circuits block 170 has eight 3-lead busses with one such bus connected to each of the port address inputs as will be described more fully below. The maintenance address selected by circuits 160 is applied to selected channel circuits 170 which connects the address on lead 30 of port 4 to maintenance multiplexers 162 and 168. Since in this example, the port 4 address is that of channel 1, the channel 1 busses are connected to LED's 122 and 128. This operation is shown in more detail below with reference to FIG. 8.

Although in FIG. 6, I have shown a separate set of LED's for the port input bus and output bus, and for the channel input and output bus, a simpler display is preferred which will utilize the same set of LED indicators for both the input tests and the output tests. Of course, only one direction of data flow is tested at a time with this arrangement. In FIG. 7, the typical control panel configuration shown has the maintenance display indicated at the top portion of the panel 165. For purposes of illustration, the input test indicators 130 are shown with LED's 120 representing the send side and LED's 122 representing the receive side. In the central portion of panel 165, the set of eight seven-segment displays 100 is shown with the set of eight displays indicating the connection between the ports and channels as discussed earlier. For the connection used in the examples heretofore in which port 4 is interconnected to channel 1, the indicator labeled port 4 would show a 1 indicating to the operator that port 4 is interconnected with channel 1. To the left of the port and channel interconnect displays 100 is a seven segment display 146 which indicates which input port to matrix 40 is being tested by the maintenance channel and display 148 which indicates the channel output from matrix 40 being tested.

Below the seven-segment display units may be seen the set of eight push buttons 52 identified with each port which are utilized to select the channel for interconnection to a port with the port disable toggle switches 74 immediately below its corresponding channel select push button. To the left of push buttons 52 is push button 141 which, as explained above, is utilized to select the port desired to be tested. When an input to a port is to be tested, push button 14 is held down until display 146 reads the desired port and display 148 remains dark. When the output of the same port is to be tested, push button 141 is depressed momentarily. Display 146 will extinguish and display 148 will automatically indicate the channel to which that port is interconnected.

Figure 8:
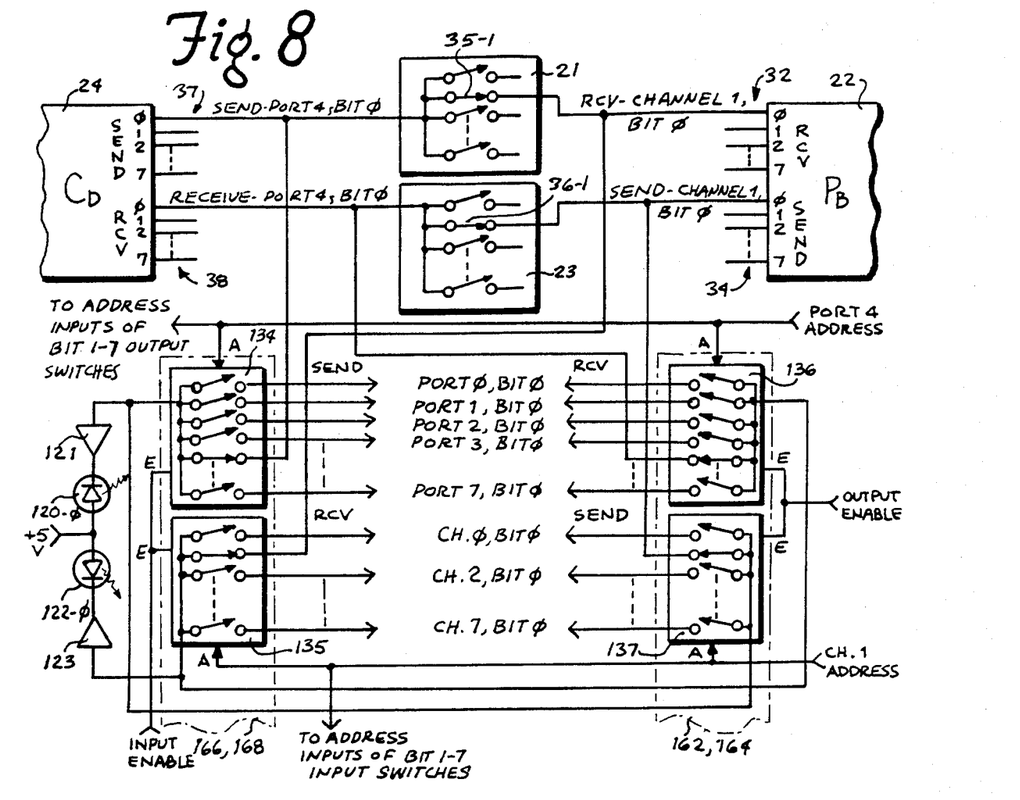
FIG. 8 is a schematic diagram of a portion of the maintenance channel of FIG. 6 showing the connections for the $\emptyset$-bit for one port to channel connection.
Figure 9:
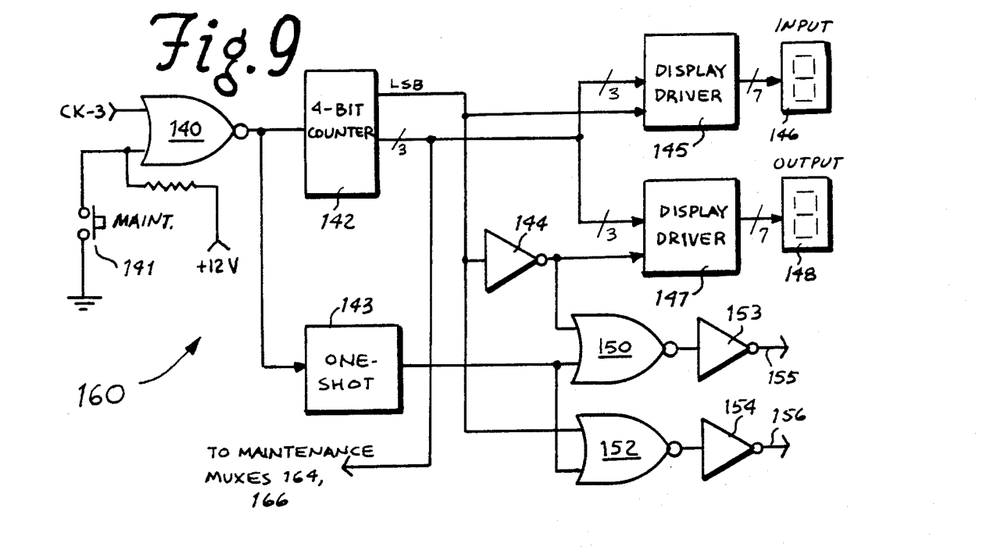
FIG. 9 is a schematic diagram of the maintenance address select circuits of FIG. 6.

Turning now to FIGS. 8 and 9, details of the operation of the maintenance channel will be explained. FIG. 8 shows a circuit diagram for the analog switches used in maintenance multiplexers 162, 164, 166 and 168 for bit ∅ of the port and channel SEND and RECEIVE busses. It is to be understood that each of the remaining seven bits will require a set of four analog switches, now shown to simplify the diagram. Also shown is computer $C_d$ 24 having an eight lead SEND bus 37 with the ∅-bit lead shown connected to analog switch 21 in matrix 40 and the ∅-bit lead in the 8-bit RECEIVE bus 38 from port 4 shown connected to analog switch 23 in matrix 40. As indicated, analog switches 21 and 23 have been addressed with the 3-bit address representative of the ONE output thereof. This address closes switch 35-1 in analog switch 21 which connects SEND port 4, bit ∅ to RECEIVE channel 1, bit ∅ in the RECEIVE bus connected to printer $P_b$ 22. Similarly, the address causes switch 36-1 to close, connecting the SEND bit ∅ lead of channel 1 to the RECEIVE bit ∅ lead of port 4 and computer $C_d$ 24. Analog switch 134 is one of eight identical switches comprising the eight SEND maintenance multiplexers 166 in FIG. 6 and analog switch 135 represents one of the eight RECEIVE multiplexers 168 in FIG. 6. As indicated, the eight switch points of analog switch 134 connect to the ∅ bit leads of the eight SEND ports; however, only the connection of switch point 4 to the ∅ bit lead of the SEND port 4 is shown. Similarly, analog switch 135 has its switch points connected to the ∅ bit leads of the eight RECEIVE channel busses with the ∅ contact being connected to bit ∅ of channel ∅ and so on. In the example, switch point 1 connects to bit 0 of RECEIVE channel 1 which represents the RECEIVE bus from matrix 40, analog switch 21. Analog switches 136 and 137 are associated with the data flow from the peripheral back to the computer, with analog switch 137 connected to the printer SEND busses and analog switch 136 connected to the computer RECEIVE busses.

Referring now to FIG. 9, the control of the analog switches in maintenance multiplexers 164, 166 will be described. A 4-bit counter 142 is used to generate the port addresses which permits the operator to select the port to which the maintenance channel circuits will be connected. The 4-bit counter 142 will produce four parallel output bits; however, only the three most significant bits are utilized as the port address. The counter will thus step twice while outputting one port address. The least significant bit is available and is used to select whether the input will be tested, that is, from the SEND side of the port to the RECEIVE side of the channel, or whether the output will be tested, that is, from the SEND side of the peripheral to the RECEIVE side of the port. The 3-bit address from counter 142 is fed to two display drivers 145 and 147. Display driver 145 operates display 146 labeled INPUT and display driver 147 operates display 148 labeled OUTPUT. Only one of the displays 146 and 148 will be illuminated at a time. When the operator selects the port to be tested, the presence of a HIGH for the least significant bit from counter 142 will cause display driver 145 to indicate the selected port on display indicator 146. The three address bits from counter 142 are connected to maintenance multiplexers 164 and 166 as shown in FIG. 6. However, only one of these multiplexers will be enabled. When INPUT indicator 146 is illuminated, a HIGH will appear on input enable lead 156 from OR gate 152 and inverter 154. Thus, only multiplexer 166 will be enabled connecting indicators 120 in FIG. 6 to the input bus of port 4. Due to inverter 144, display driver 147 is disabled and therefore OUTPUT indicator 148 is off. Similarly, a LOW appears on output enable lead 155 which disables maintenance multiplexer 164.

The operator may then press push button 141 momentarily permitting clock pulse CK-3 to step counter 142 one count. This will cause only the least significant bit from counter 142 to change. When the LSB is low, display driver 147 is enabled causing the OUTPUT display indicator 148 to show the channel number. The input enable signal on lead 156 is removed and output enable lead 155 is energized; this action disabling maintenance multiplexers 166, 168 and enabling maintenance multiplexers 162, 164. Thus, LED's 120, 122 will indicate the bit levels of the printer 22 SEND bus and computer 24 RECEIVE bus. It may be noted in FIG. 8, LED driver 121-∅ is connected to both SEND switches 134 and 137, and LED driver 123-∅ is connected to both RECEIVE switches 135 and 137. The enable circuits discussed above control which pair of switches operate LED's 120-∅ and 122-∅.

One-shot 143 in FIG. 9 serves to disable all maintenance multiplexers during the maintenance channel selection process.

Figure 10:
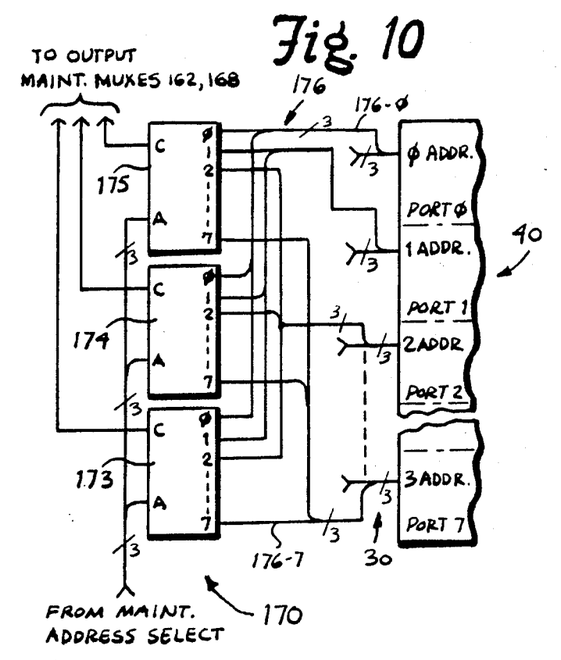
FIG. 10 is a schematic diagram of the selected channel circuits of FIG. 6.

As described above, the address of port 4 for the example of FIG. 8 is selected by the operator. It is then necessary to obtain the channel 1 address to cause maintenance multiplexers 162 and 168 to switch to the channel 1 SEND and RECEIVE busses 32, 34. Selected channel circuits 170 shown in block diagram form in FIG. 10 provide this address. Three type 451 analog switches 173, 174 and 175 are used to generate the desired 3-bit address on address bus 172. The common lead from each of the three switches are utilized for this bus and connect to the address inputs of maintenance multiplexers 162, 168. A set of light address busses 176, each formed by three leads from the switch terminals of switches 173, 174, 175 are connected in parallel with the address busses to the light ports of the exemplary system and the leads of each bus are connected to the switch outputs corresponding to each busses port. For example, bus 176-∅ has three leads with a lead connected to the ∅ terminal of each switch and is connected in parallel with the address bus to port ∅. Therefore, whatever channel address which is present at port ∅ will appear on the ∅ switch terminals of switches 173, 174, and 175. As may now be understood, the maintenance address selected by the operator, when applied to address inputs "A" of switches 173, 174 and 175 will cause the common terminals "C" to all be switched to the same output terminal number. In the present example, when the port 4 address is selected, the common terminals will be connected to output terminals 4. Since the 4-bus is in parallel with the port 4 address bus, and port 4 is connected to channel 1, bus 172 will apply the channel 1 address to maintenance multiplexers 162 and 168.

Figure 11:
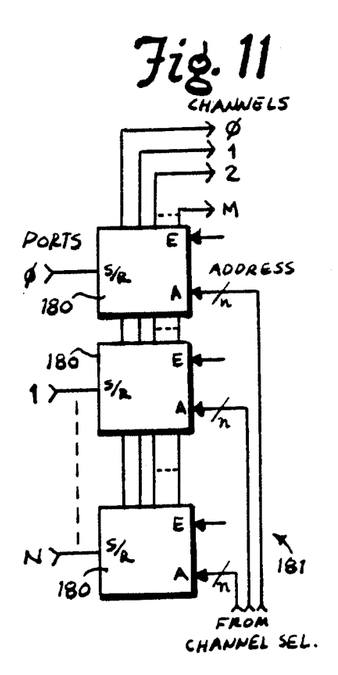
FIG. 11 is a simplified block diagram of an analog version of my invention for coupling analog sources to analog sinks in a two wire full duplex mode.

Although my interconnection system has been explained with reference to a digital system carrying parallel digital data, it is to be remembered that the actual interconnection is a true analog path (within the dynamic range of the analog switches) capable of carrying two-way time varying signals. The system may therefore be used to switch analog sources and sinks. A simple example of this application of my invention is shown by FIG. 11 in which a set of N analog switches 180 are arranged to provide N input ports. Each input port is a common terminal of an M-point analog switch. The M output terminals of switches 180 are connected in parallel to form M channels. Each switch 180 has an address input A having address busses 181. Each bus has n leads where M is equal to $2^n$. Assume that various sound sources are connected to ports ∅ through N; for example, radio receivers, tape decks, phono turntables and the like, each at 0 dBm at 600 ohms. The channel outputs may be connected to amplifiers and speakers at various locations, recorders, repeaters, radio transmitters, monitors and other such devices. Using a channel selection address generator as previously described, up to m channel devices can be driven from the various port-connected sources. My invention permits rapid switching as may be required.

Figure 12:
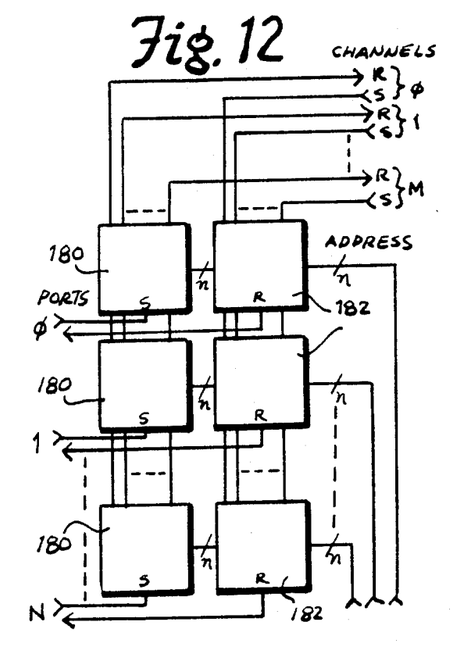
FIG. 12 is a simplified block diagram of an analog version of my invention for coupling analog sources to analog sinks in a four wire full duplex mode.

Another example is the use of the arrangement of FIG. 11 to interconnect telephone devices. Since analog switches 180 are bilateral, 2-wire full duplex service is possible. Similarly, FIG. 12 illustrates a full 4-wire duplex interconnect system suitable for start-stop teletypewriter service, facsimile service or others that require a dedicated one-way channel in each direction. Here, the common terminals of analog switches 180 are connected to the SEND outputs and the common terminals of analog switch 182 are connected to the RECEIVE inputs of one set of devices. The channels each have a SEND and RECEIVE lead connected to a second set of devices. The address inputs of each pair of switches 180, 182 are connected in parallel. In accordance with my invention, the devices in one set may be quickly connected to devices in the second set as desired by digital addresses.

When my matrix is used in connection with commercial telephone systems, the characteristics of the analog switches used must be considered. For example, the type 4051 analog switches which may be used would require protection from the high central office dc and ringing voltages by means of suitable interface circuits. Also, the voice voltages would be maintained at the required peak voltages of the analog switch and amplified if necessary before transmission over telephone circuits. Modems would be used for teletype circuits between the matrix and the telephone lines.

Although I have here shown a special matrix for analog systems tailored to the particular types of input and output devices, those of skill in the art will understand that a digital system as used in the exemplary system hereinabove can be used for analog applications. In such case, the address inputs to a row of analog switches in parallel to form a single port would be separated and each port would be usable as n analog inputs, with n representing the number of parallel bits accepted by such port. It is also clear that such a matrix can be applied to a hybrid system having both digital and analog inputs.

Although I have disclosed my invention using an example of an 8×8 duplex matrix for digital systems, it will be obvious to those of skill in the art to vary the number of matrix points and analog switches to provide almost any desired number of parallel bits per byte and numbers of ports and channels. Similarly, the exemplary analog and non-synchronous system applications illustrated are amenable to changes in capacity and type of devices which can be interconnected. Such variations, modifications and changes are to be considered within the scope and spirit of my invention.

I claim:
1. A four-wire duplex interconnection system for selectively connecting M pairs of digital data sources and sinks simultaneously to N pairs of digital data sources and sinks in which said digital data is composed of parallel bytes of X digital bits comprising:
   an interconnection matrix having M rows and X columns, each of said M rows serving as an input port for one of said M pairs of data sources and sinks;
   a plurality of analog switches, a pair of said switches disposed at each intersection of said rows and columns, each of said switches having a common input and X poles, and a digital address input for receiving a different digital address associated with each of said poles, said poles having a common input selectably connectable to one of said poles in response to its digital address, each of said common inputs serving as an input port for one of said X bits from or to a source or sink connected to said port wherein respective ones of said X poles of each pair of said switches in one of said rows are connected in parallel with the respective ones of said X poles of each pair of said switches in all other of said columns;

X output busses, each of said busses having 2X conductors, each of said busses formed by a conductor from one pole of each of said switches in each column of said paralleled switches, said busses providing output connections to said N pairs of data sources and sinks; and channel selection means for generating X addresses indicative of each of said X output busses, said channel selection means having a separately controllable address output connected to each of said rows of said switches whereby said M pairs of sources and sinks are connectable, selectively to said N pairs of data sources and sinks.

2. An interconnection system for selectively connecting M digital data sources generating parallel bytes of n bits with parallel digital data sinks comprising:

(a) an interconnection matrix having n columns and m rows, each of said m rows serving as an n terminal input port for receiving said parallel digital data bytes thereby providing m ports and said n columns serving as a set of N output channels for connection to a set of data sinks;

(b) a multiplicity of analog switches, at least one of said switches disposed at each intersection of said columns and rows, each of said switches having (i) n outputs with each output serving as a lead for one of said n bits, each of the corresponding n outputs of all switches in a column connected in parallel;

(ii) a common input selectively switchable to establish an analog path to any one of said n outputs, each of said common inputs in a row serving as an input port terminal for one of said n bits from a data source; and (iii) an address input for electronically switching said common input to any one of said n outputs, said address inputs for all switches in each one of said rows connected in parallel;

whereby said N output channels are produced by forming N busses from the like numbered outputs of each set of said analog switches in said n columns; and (c) channel selection means for generating addresses indicative of each of said N channels, said channel selection means connected to said address input for each of said m rows, said channel selection means controllable to thereby connect any of said N channels to any one of said M ports.

3. The system as defined in claim 2 in which said address inputs of said analog switches are responsive to digital address codes.

4. The system as defined in claim 3 in which said channel selection means includes:

counter means associated with each of said ports for generating said digital address codes;

display means connected to each of said counter means for indicating the address code being generated by each of said counter means; and operator control means connected to said counter means for selecting a desired address code.

5. The system as defined in claim 4 in which:

said analog switches include means for selectively enabling and disabling said switches responsive to a control signal; and in which said channel selection means includes enable and disable control signal producing means connected to said analog switches for disabling a port during selection of a channel address code and enabling said port after such selection.

6. The system as defined in claim 5 in which said enable and disable control signal producing means includes master disable control means for simultaneously disabling all of said analog switches and master enable control means for simultaneously enabling all of said analog switches.

7. The system as defined in claim 2 which further comprises:

a plurality of indicator means for visually indicating the digital logic level on a signal lead; and maintenance channel means for selectively coupling a first set of n of said indicator means to a first port input bus of one of said n terminal input ports and a second set of n of said indicator means to the one of said n terminal output channels directly connected to said first port input bus whereby said plurality of indicator means indicates whether the digital logic level of an output bit is identical to the digital logic level of its corresponding input bit.

8. The system as defined in claim 7 in which said indicator means includes:

a light emitting diode; and a driver amplifier having a high impedance input for connection to a signal lead and an output connected to said light emitting diode.

9. The system as defined in claim 7 in which said maintenance channel means includes:

a first set of n analog switches for connection to said n terminal input ports, each switch of said first set of switches having its common terminal connected to one of said driver amplifiers, said switches each having an address input;

a second set of n analog switches for connection to said n terminal output channels; each switch of said second set of n analog switches having its common terminal connected to one of said driver amplifiers, said switches each having an address input; and maintenance address selection means coupled to said address inputs of said first set of switches for connecting said common terminals of said first set of switches to a selected one of said n-terminal input ports; and selected channel address selection means for connecting said common terminals of said second set of switches to the n-terminal output channel connected to said selected one of said n-terminal input ports.

10. The system as defined in claim 9 in which said maintenance channel means further includes display means for indicating the selected one of said n-terminal input posts.

11. The system as defined in claim 9 in which:

each one of said first set of analog switches includes a digital address, said maintenance address selection means connected to the address input of each of said first set of switches and adapted to generate the address representative of the selected input port; and said selected channel address selection means includes a third set of analog switches having its common terminals connected to said address inputs of said second set of switches and its output terminals forming busses connected in parallel with the address inputs of said M ports.

12. The system as defined in claim 2 in which:
said analog switches include addressing means responsive to y binary digits for switching said common input to anyone of $2^y$ outputs; and
said channel selection means for selectably generating said y binary digits.

13. The system as defined in claim 2 in which:
said channel selection means includes a plurality of binary counters, each one of said counters having y parallel output leads connected to said addressing means of at least one of said analog switches.

* * * * *